March 6, 1956 S. GALICK 2,737,108
BORER PIN FOR HAY BALERS
Filed May 26, 1953

INVENTOR.
Stephan Galick
BY
McMorrow, Berman & Davidson
ATTORNEYS

United States Patent Office 2,737,108
Patented Mar. 6, 1956

2,737,108

BORER PIN FOR HAY BALERS

Stephan Galick, Rutland County, Vt.

Application May 26, 1953, Serial No. 357,515

1 Claim. (Cl. 100—98)

This invention relates to an attachment for a hay baler, and more particularly, has reference to a pointed assembly connectible to the plunger of a field pick-up hay baler. The device, when so attached, is effective to form a through opening in the completed bale, thus to aerate the center portion of the bale and prevent the hay from becoming moldy and spoiled.

It is well appreciated in farming that in many instances baled hay will spoil, due to the fact that dampness in a bale cannot be eliminated, as a result of which mold forms, thereby rendering the hay useless for feed.

Heretofore, it has been proposed to provide a pointed device for the plunger of a hay baler, which will form a through opening in the completed bale, and such a device is not broadly claimed as the invention. Rather, the present invention is an improvement on devices of this type, which renders the same commercially feasible. It has been found that those pointed assemblies heretofore devised for mounting on the plungers of baling structures have not worked satisfactorily due to the fact that they have been too short, so far as the points thereof were concerned. Further, it has been found that the mere provision of a point on a plunger, to form an opening in the baled hay, is not sufficient, since an excessive amount of force is required to force the point into the hay.

This is particularly true when the hay being baled is windrow hay. Hay of this type is baled in the field, and is quite damp. In view of the characteristics of windrow hay that is to be baled by means of a field pick-up baler, it is necessary that the hole-forming assembly be particularly adapted for cutting through the hay, to make the necessary opening therein, and an important object of the present invention, accordingly, is to provide a hay baler point or borer pin that will be efficient when used on a field pick-up baler, for the purpose of baling hay of the particular type referred to above.

Other objects will appear from the following description, the claims appended thereto, and from the annexed drawing, in which like reference characters designate like parts throughout the several views, and wherein:

Figure 1:
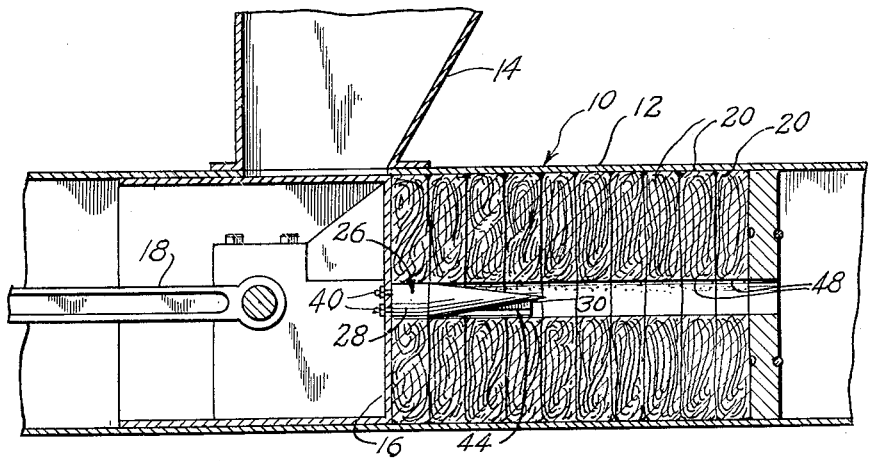
Figure 1 is a longitudinal, fragmentary, sectional view through a field pick-up baler equipped with a borer pin assembly formed in accordance with the present invention, said assembly being shown in side elevation.
Figure 2:
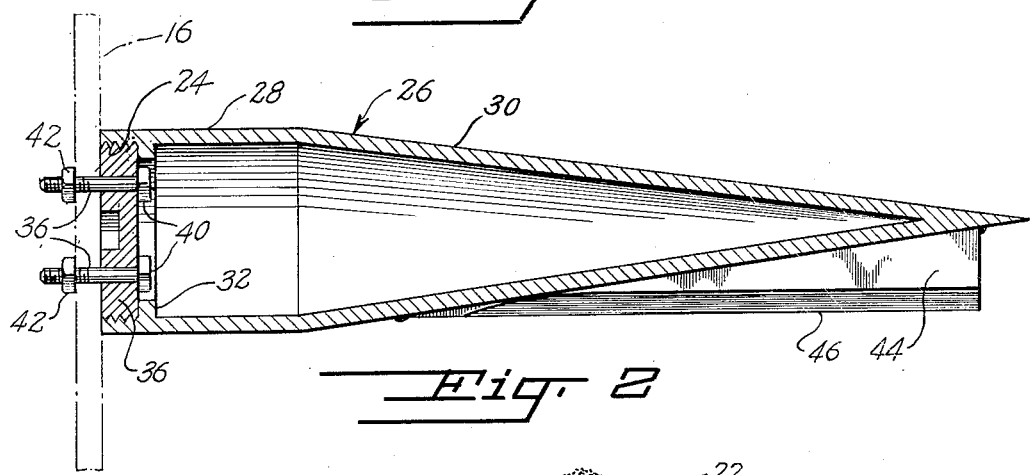
Figure 2 is an enlarged longitudinal sectional view through the borer pin assembly per se, the baler plunger being illustrated in dotted outline.
Figure 3:
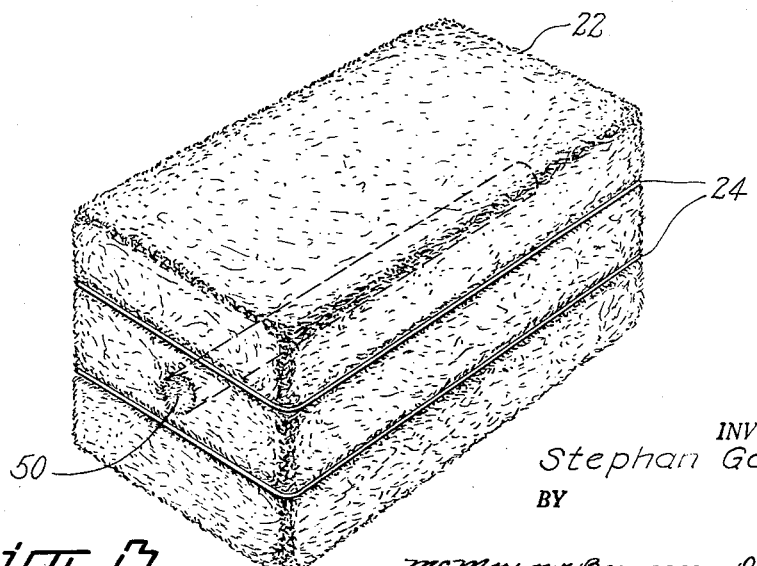
Figure 3 is a perspective view of the completed bale, having therein a through opening formed by the pin assembly.

The reference numeral 10 has been applied generally in the drawing to designate a conventional field pick-up baler. In this connection, the invention can be applied readily to any of various makes of field pick-up balers. In the illustrated example, the baler has the usual baling chamber 12, a hopper 14 communicating with said chamber. A plunger 16 works in the chamber 12, and is actuated by a bar 18. The hay is fed into the chamber through the hopper 14, and is formed into layers 20, said layers 20 being compressed to provide, as the completed product, a bale 22 securely tied as at 24.

The invention has been designated generally by the reference numeral 26, and includes an elongated, hollowly formed pin having a relatively short, cylindrical base 28 merging into a long, conical tip 30. The tip 30 extends through approximately three-fourths to four-fifths of the total length of the pin, this being of importance since it has been found that previous devices conceived for the same purpose have, in general, been formed with stubby, pointed tips that would not work efficiently in forming openings in the completed bales.

In any event, within the cylindrical base 28, and in closely spaced relation to that end of base 28 remote from tip 30, there is formed an internal, annular flange 32, the inner surface of the base being threaded as at 34 between said flange and the adjacent, outer end of the base. A cap 36 is externally threaded, and is of disc-like formation, said cap being threaded into the base 28 against the flange 32, so as to close the pin at one end.

Cap 36 is formed with spaced openings 38 receiving bolts 40, said bolts 40 being extended through openings formed in the plunger 16 of the baler, and being secured to said plunger by means of nuts 42.

By reason of this arrangement, it is seen that the pin is fixedly mounted on the center portion of the plunger, so as to project longitudinally and centrally of the baler chamber 12.

Extending through substantially the full length of the conical tip 30 is a knife 44, said knife being welded or otherwise fixedly secured to the tip and being formed with a straight cutting edge 46 that extends in parallelism with the longitudinal center line of the conical tip. The knife 44, when considered in cross section, is disposed radially of the conical tip, and it is also important to note that the cutting edge 46 is spaced more closely to the tip axis than is the wall of the base 28.

This particular arrangement causes the device, when used in a field pick-up baler, to penetrate the layers 20 with ease, it being a notable characteristic of the construction that each layer will first be penetrated by the pointed end of the tip 30, said pointed end, serving in effect, as a pilot device. Immediately after penetration of the layer 20 by the pointed end, the knife 44 moves through the layer, slicing or slitting the layer along a line that constitutes a radius of the opening to be formed in the layer. Continued movement of the device through the layer causes the slit to be widened by the progressively increased diameter of the conical tip, until the opening in the layer has been formed to the full diameter of the base 28. The openings of the layers have been designated by the reference numeral 48, and when the bale is completed, a through opening 50 will result, extending from end to end of said bale and aerating the center of the bale for the purpose of preventing mold from forming.

The use of an elongated, gradually tapering tip on the device is very important, considering the fact that the device is specifically intended for forming openings in bales comprised of windrow hay. Further, it is also very important that the device include an elongated knife disposed radially of the gradually tapered tip, to cooperate with the tip in breaking the hay to facilitate passage of the tip therethrough. Were it not for these characteristics of the invention, the device would not, it is thought, act efficiently on windrow hay baled by means of a conventional field pick-up baling machine of modern design.

With further reference to the particular formation and relative arrangement of the knife and conical tip 30, the leading edge of the knife extends perpendicularly to the longitudinally sharpened edge 46 thereof, slightly to the rear of the pointed forward extremity of said tip. Said leading edge of the knife need not be sharpened, but nevertheless can exert a cutting action on hay extending across its path. This is due to the fact that said leading edge is disposed broadside to the path of movement of the tip, and in fact is exactly perpendicular to said path. The leading edge of the knife, accordingly, breaks up a considerable portion of the hay in advance of the larger diameter portions of the tip, so as to constitute means for reducing the amount of hay that will be compressed about the wall of the hole found in the bale by the advancing tip. The longitudinal cutting edge of the knife, meanwhile, further breaks up the compressed hay in the manner previously described herein, so that in the final analysis the wall of the hole or bore formed by the advancing pin will be composed of relatively loosely arranged pieces of hay, thereby permitting maximum penetration of said wall by air flowing through the hole.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A boring pin assembly for a hay baling machine of the field pick-up type comprising: an elongated pin having a cylindrical base and a conical tip extending from and aligned coaxially with said base, said tip extending in length a distance at least three times that over which the base extends; means on the base for fixedly securing the same to a baling machine plunger; and an elongated knife arranged longitudinally of said pin and having a leading end spaced a short distance inwardly along the length of the tip from the pointed extremity of said tip, said knife having a trailing end spaced forwardly a short distance from the larger, base-attached end of the tip, the knife being of flat formation over its entire area and when viewed in cross section being disposed radially of the tip, said knife having a straight leading edge perpendicular to the axis of the tip and a straight edge extending in parallelism with the axis of the tip, said second edge being spaced from the axis of the tip a distance less than the radius of the cylindrical base of the pin.

References Cited in the file of this patent
UNITED STATES PATENTS

| | | |
|---|---|---|
| 649,762 | Saltzkorn et al. | May 15, 1900 |
| 817,984 | North | Apr. 17, 1906 |
| 2,345,731 | Coyle | Apr. 4, 1944 |
| 2,413,522 | Russell | Dec. 31, 1946 |
| 2,420,932 | West | May 20, 1947 |